March 30, 1937.  J. E. RAMSBOTTOM ET AL  2,075,659
APPARATUS FOR PREVENTING ICE ACCUMULATION ON AIRCRAFT
Filed May 7, 1936
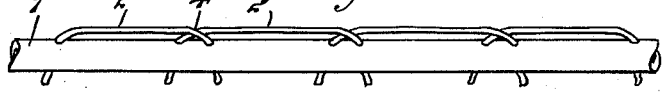
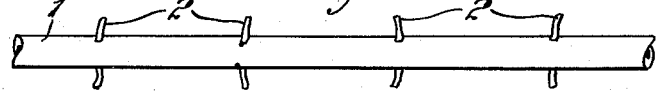
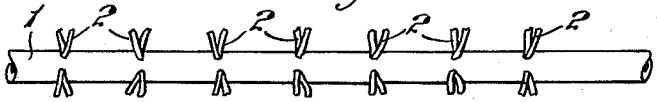
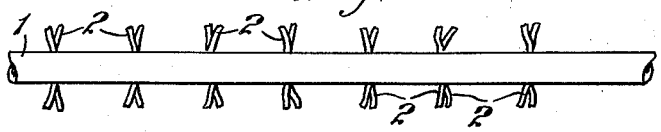
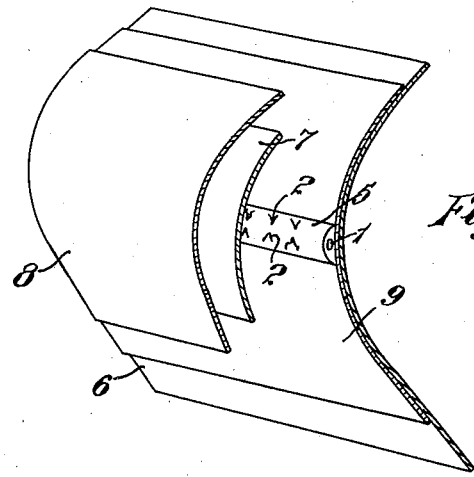
Inventors
John Edwin Ramsbottom
Benny Lockspeiser
Charles J. Stewart
by Usina & Rauber, Attorneys Patented Mar. 30, 1937

2,075,659

UNITED STATES PATENT OFFICE 2,075,659

APPARATUS FOR PREVENTING ICE ACCUMULATION ON AIRCRAFT

John Edwin Ramsbottom, Benny Lockspeiser, and Charles John Stewart, Farnborough, England Application May 7, 1936, Serial No. 78,328
In Great Britain May 8, 1935

6 Claims. (Cl. 244—134)

Our invention relates to improvement in means for preventing the accumulation of ice on aircraft and other moving objects and more particularly to improvements on the method and apparatus described in our co-pending application Serial No. 13,050 filed March 26, 1935.

In the invention in the above mentioned application formation or adhesion of ice upon the surfaces of aircraft and other moving objects is prevented by covering the surface to be protected from ice with a covering material permeable to an ice preventing liquid such as ethylene glycol and in the continuous supplying of the ethylene glycol or other ice preventing fluid through a conveying tube having openings spaced to distribute the ethylene glycol through the permeable covering.

The improvement of our present invention relates to the distribution of the ethylene glycol or other ice preventing fluid through the distributing openings to the permeable covering and provides a capillary fluid transmitting means in the supply outlets.

In our invention, therefore, the ice preventing fluid is transmitted through a tube mounted on or in the leading edge of the surface to be kept free from ice, such as the leading edge or edges of the wings, struts, propeller surfaces, etc., and is distributed through spaced openings in this tube, and these openings are filled or provided with wicks or wick-like thread which convey the liquid from the tube and distribute it to the permeable covering surface by capillary action. A distributing pad or spreader band may be provided between the conveying tube and the permeable covering so as to ensure a uniform distribution of the ice preventing fluid.

These various features of the invention are illustrated by way of example in the accompanying drawing in which—

Figs. 1 to 5 show diagrammatically the various arrangements of the thread in the tubes, and Fig. 6 is a part perspective view of a portion of an aircraft wing structure provided with a threaded tube, spreader band and permeable outer covering embodying a preferred feature of the invention.

In the embodiments shown in the drawing, the walls of the tube 1 are pierced with a series of apertures which may be spaced at equal distances apart as in Fig. 3 and Fig. 4, or which may be spaced apart in pairs as shown in Figs. 1 and 2.

A thread or threads 2 of absorbent material are threaded through the apertures into the interior of the tube in order to act as wicks which constantly absorb and conduct the ice-preventing liquid within the tube by capillary action through the apertures in the wall of the tube for ultimate distribution by the permeable covering 8, Fig. 6.

The capillary action may be assisted by pressure exerted upon the liquid in the tube and may be modified by using threads of slightly smaller diameter than the apertures in the tube or by using plain apertures combined with threaded apertures.

In the construction shown in Fig. 1, the continuous length of thread is passed transversely through both walls of the tube and is threaded back again almost immediately in the same way to the original side along which comparatively long pieces of thread 3 are thus left exposed.

In the construction shown in Fig. 2, a series of shorter lengths of thread are passed through the tube so that their ends cross one another at 4, thereby providing a substantially continuous length of saturated thread extending longitudinally along the surface of the tube.

Fig. 3 shows a construction in which more widely spaced short lengths of thread are employed, which may if desired, be inserted originally in one long length from which the portions between the apertures are cut away.

Figs. 4 and 5 show constructions in which more than one short length of thread is threaded through the apertures.

In Fig. 4, the apertures are pierced close together in the wall of the tube, whereas in Fig. 5 the threads are passed through apertures diametrically opposite to one another.

Suitable flexible material such as rubber may be used for the tubes and the absorbent threads may consist of wool, cotton, silk or other suitable absorbent fibre or mixture of fibres.

The tubes 1 may be laid in grooves of suitable depth formed in the leading edge of the wing itself, but where such grooves are not available, the tubes may be formed in or carried by a substantially flat molded support 5, Fig. 6, conforming to the streamline contour 6 of the leading edge.

One or more of such tubes may be used as may be found necessary.

A spreader band 7 of absorbent cotton fabric may be superposed on the ends or exposed portions of the wicks 2, which protrude from the tube, this spreader band overlapping the tube or tubes 4 to 5 and having as its function to absorb and distribute more widely the liquid ethylene glycol fed locally to its under-surface to be conveyed therethrough by capillary action to the under-surface of the outer permeable covering 8.

When the tube or tubes are not laid in a groove or grooves in the wing, or when thick wicks are used, it is sometimes desirable to position a stiff perforated sheet between the wicks and the spreader band to preserve the streamline contour of the leading edge.

Upon the spreader band is positioned the permeable covering 8 which may be of leather and which may be fastened and tensioned along its edges in known manner to a backing strip 9 secured to the leading edge and beneath the tube 1 to protect the wing structure of the aircraft from the ethylene glycol or other liquid used in the tube.

When flying under the conditions of humidity and temperature conducive to ice formation, the ethylene glycol permeating the leather covering, mixes with the super-cooled moisture, all or part of which is thus prevented from freezing and from causing ice formation or accretion.

The aqueous glycol solution formed on the outer surface of the permeable covering is carried away by the stream of air flowing over it together with any ice which may have formed.

The liquid so lost from the leather surface is continually replenished by the spreader band beneath it, which in turn is continuously fed by the capillary action of the wick-like threads supplied from the tubes.

It will be understood that the specific construction of the tube is given merely by way of example and that other tubular passages independent or built into the wing or other structure may be employed.

Having now particularly described our said invention—

We claim:—

1. Apparatus for preventing ice formation on surfaces, which comprises a permeable covering on said surfaces, tubular passageways for conveying an ice-preventing fluid to said permeable covering and having spaced openings through which said fluid passes to said covering and capillary means in said openings for the passage of said fluid therethrough.

2. Means for preventing ice formation on surfaces, which comprises a permeable covering on said surfaces, tubular means for conveying an ice-preventing fluid to said permeable covering and having spaced openings from the interior of said tube to said permeable covering, and wicks between said openings and said covering for conducting fluid from said tube to said permeable covering.

3. The apparatus of claim 2, in which said wicks comprise thread passing from apertures on each side of the tube.

4. The apparatus of claim 2, in which said wicks extend longitudinally on the surface of the tube.

5. Apparatus of claim 2, in which said wicks comprise more than one thread passing through pairs of adjacent openings.

6. The apparatus of claim 1, in which a layer of absorbent fabric is placed between a permeable covering and the capillary means.

JOHN EDWIN RAMSBOTTOM.
BENNY LOCKSPEISER.
CHARLES JOHN STEWART.